March 19, 1968  K. HEHL  3,373,459

INJECTION MOLDING MACHINE

Filed July 7, 1966  6 Sheets-Sheet 1

Inventor:
Karl Hehl
By: Spencer & Kaye
Attorneys

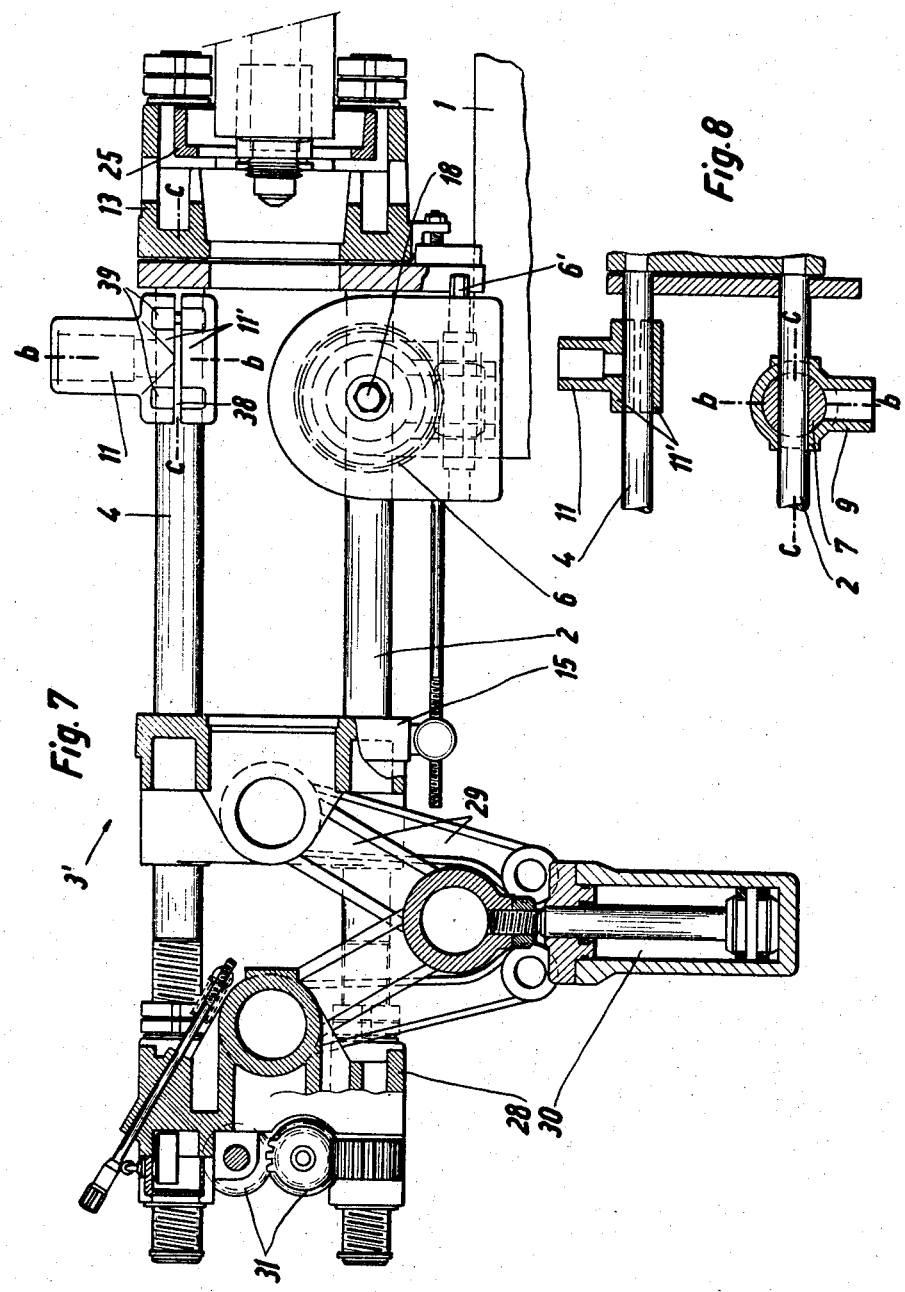

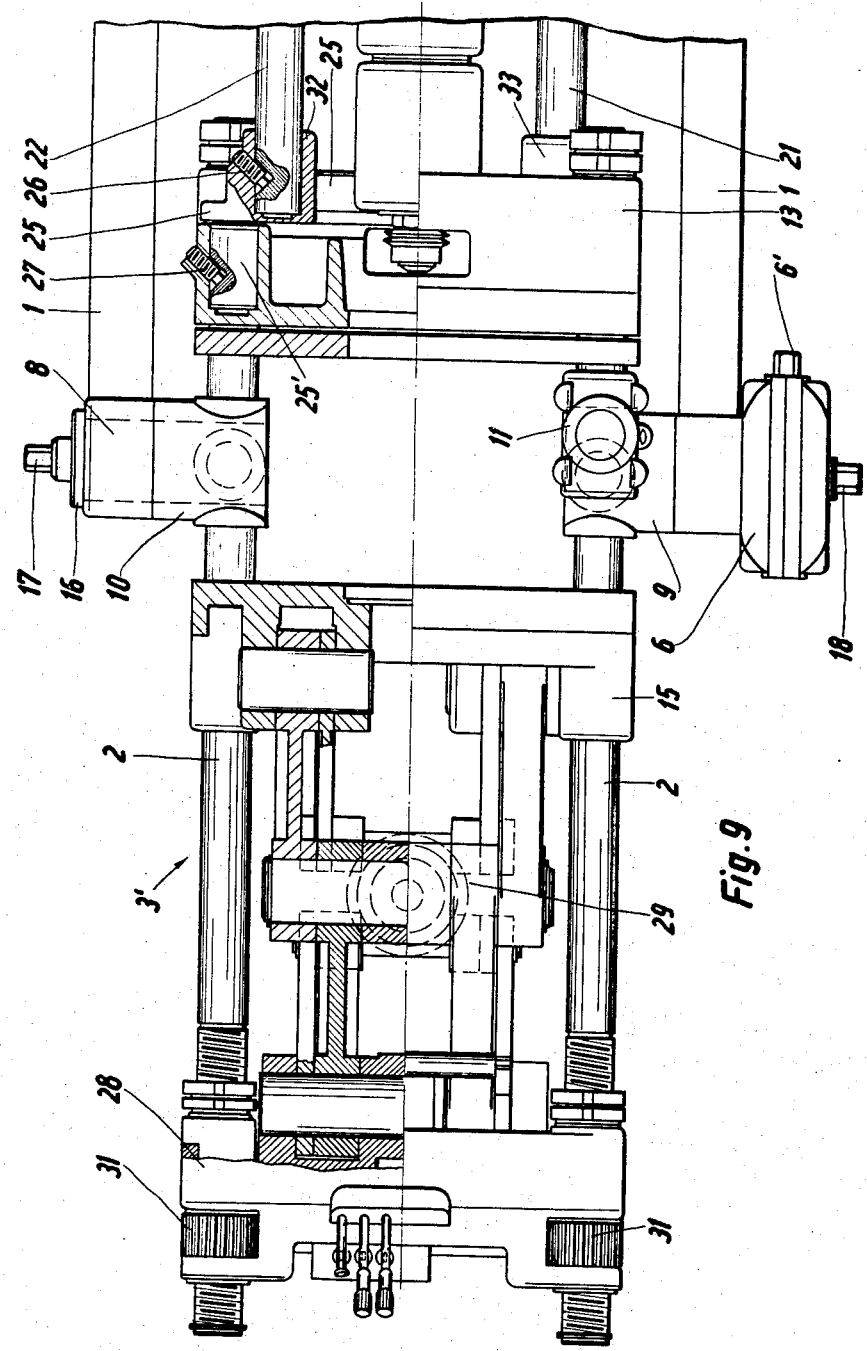

United States Patent Office 3,373,459
Patented Mar. 19, 1968

3,373,459
INJECTION MOLDING MACHINE
Karl Hehl, Lossburg, Wurttemberg, Germany, assignor to Arburg Maschinenfabrik Hehl & Sohne, Lossburg, Wurttemberg, Germany
Filed July 7, 1966, Ser. No. 563,597
Claims priority, application Germany, July 22, 1965, A 49,812
10 Claims. (Cl. 18—30)

The present invention relates to injection molding machines and more particularly to an injection molding machine in which the mold clamping unit is mounted on supporting rods and adapted to be oriented either horizontally or vertically, as desired.

It is an object of the present invention to provide an injection molding machine which can be secured to a machine frame in either the horizontal or vertical position, with at least one injection unit positioned on supporting rods in relation to the mold clamping unit in such a manner that an injection may be made into the parting line or plane of separation of the injection mold and also an injection may be made transversely thereto. In the case of the transverse injection the ends of the supporting rods of the injection unit may be connected or coupled to the adjacent mold-clamping plate of the mold clamping unit.

It is a further object of the present invention to provide an injection molding machine having one or two injection units next to a jet plate transversely to the parting line of the mold and operating into the parting line or plane of separation which may be adjusted to molds having variable dimensions and constructions as necessary, with a minimum of expense. For example, adjustment of the machine may be made to align injection units to molds having parting lines or planes of separation in varying planes, and so that the mold clamping unit is open on two sides thereof facing each other within the area of the mold in such a manner that, for example, magazine molds may be inserted therethrough and cores of any desired size may be introduced into the mold.

In accordance with the present invention, one or more freely supported injection units with one or two of these units injecting into the parting line or plane of separation are adapted to be connected or coupled exclusively by way of the ends of the supporting rods thereof, and by means of coupling members being provided for plug connections and displaceable independently of each other in the axial direction from the supporting rods, to pairs of supporting rods of the mold clamping unit whose center planes are spaced at a distance from the center line of the mold clamping unit.

In one embodiment of the present invention the sockets or bushings which clamp around a supporting rod, each socket having a bipartite sleeve-like head, are used as coupling members.

In another embodiment of the present invention the injection units are each positioned on a single pair of supporting rods whose center plane extends through the injection axis of the injection unit so supported.

In a preferred embodiment the mold clamping unit is positioned within a machine frame pivotally about an axis extending at right angles to the opening and closing direction of the mold clamping unit with the pivotal axis extending in a center plane through one of the two pairs of spars of the mold clamping unit.

Additional objects of the present invention will be apparent from the following description and drawings in which the same numbers represent like parts in the various views and embodiments and in which:

FIGURE 7 is a lateral view on an enlarged scale, partially in cross section, of a horizontally positioned mold clamping unit of the embodiment of the injection molding machine of FIGURE 6.

FIGURE 8 illustrates a cross sectioned segment of FIGURE 7.

FIGURE 9 is a partially sectioned top plan view of the portion of the mold clamping unit according to FIGURE 7.

Figure 2:
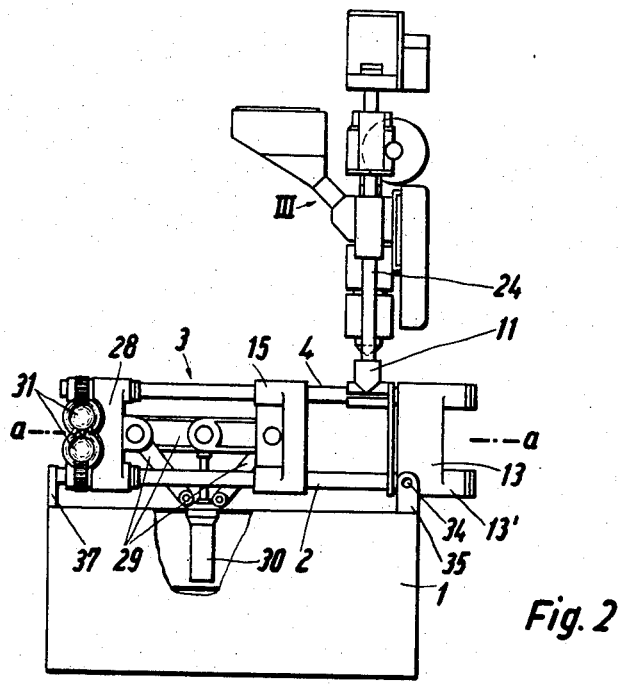
FIGURE 2 is the injection molding machine of FIGURE 1 with an injection unit connected in a vertical position to a mold clamping unit still in a horizontal position.

Referring now to the drawings and FIGURES 1 to 5 thereof in particular, therein is shown an injection molding machine having a mold clamping unit 3 and injection units I, II, and III.

Mold clamping unit 3 is mounted on pairs of supporting rods 2 and 4, each pair positioned in different parallel planes and extending in a symmetrical arrangement with respect to a center line a—a of mold clamping unit 3 with the distance between the parallel planes containing pairs of rods 2 and 4 corresponding approximately to the height of a conventional mold.

Mold clamping unit 3 includes a stationary mold-clamping plate 13, a hydraulic driving device 30 which is supported by a supporting plate 28 and is adjustable by means of helical gears 31 and drives a movable mold-clamping plate 15 along pairs of rods 2 and 4 through a lever system 29. The stationary mold-clamping plate 13 is provided with pivots 34 at the surfaces of its lateral edges with each pivot 34 extending at a right angle to the clamping surface with the pivots positioned concentrically with respect to each other and rotatably accommodated in bearing blocks 35 which are disposed next to a narrow edge of rectangular shaped machine frame 1. The central axes of pivots 34 extend in the central plane of pair of rods 2 which are the supporting rods adjacent to machine frame 1. The term "central plane" of the pair of rods is meant to be understood herein as being the plane extending through the axes of the supporting rods.

Figure 1:
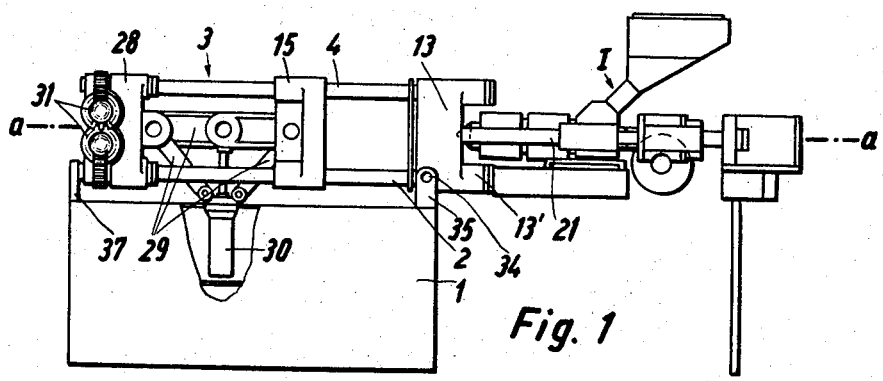
FIGURE 1 is an injection molding machine with an injection unit adjusted to a jet plate transversely to the plane of separation with the injection unit in a horizontal position.
Figure 3:
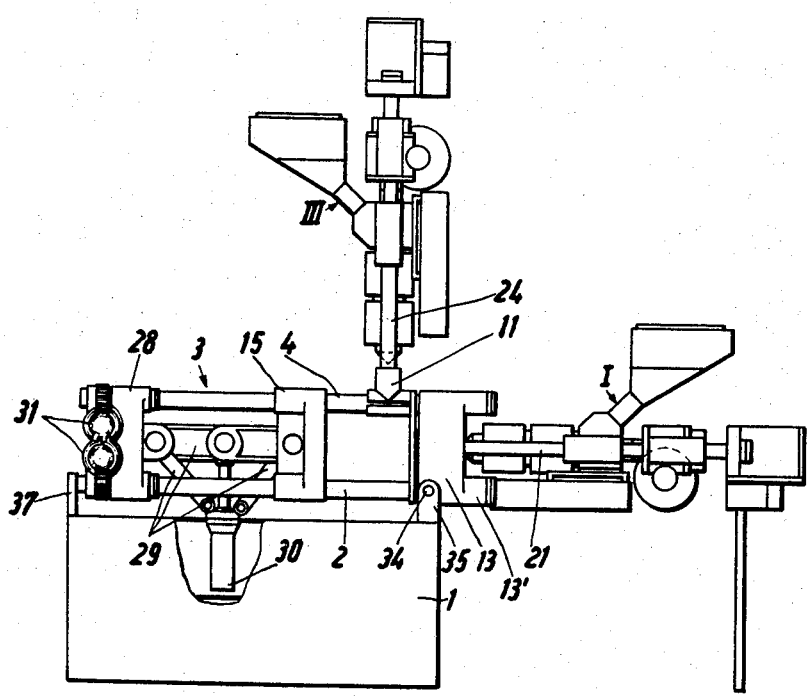
FIGURE 3 is a view of a mold clamping unit with injection units attached thereto in a manner both of FIGURES 1 and 2.

When mold clamping unit 3 is in a horizontal orientation as shown in FIGURES 1 to 3, the opposite ends of rods 2, away from pivots 34, rest in a carrier ledge 37 to which they may be clamped by means of screw bolts.

Figure 4:
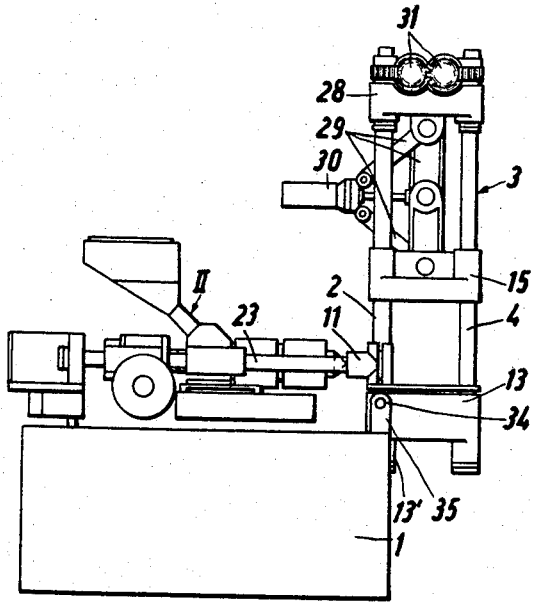
FIGURE 4 illustrates the injection molding machine with the mold clamping unit in a vertical position and a horizontally positioned injection unit aligned to the jet plate into the parting line.
Figure 5:
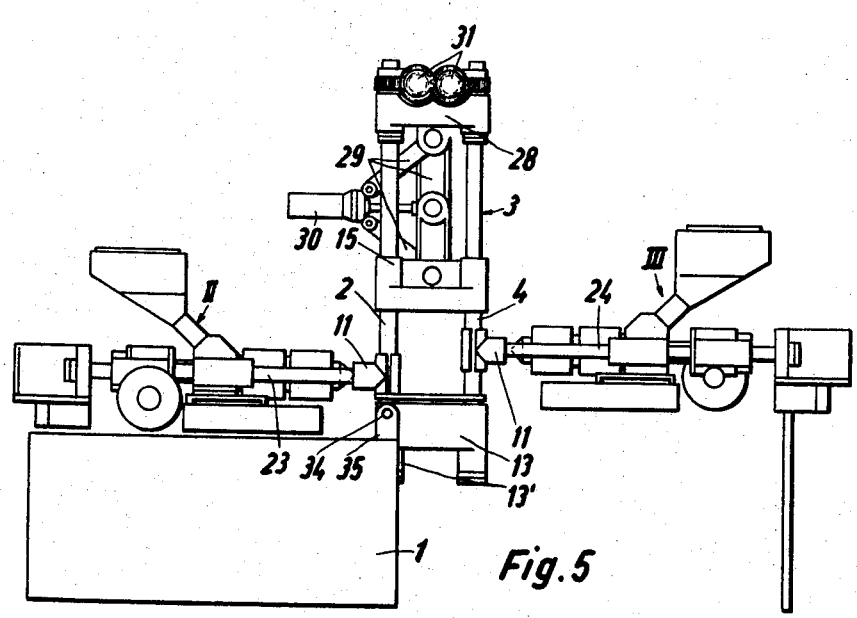
FIGURE 5 illustrates the injection molding machine with the mold clamping unit in a vertical position and with two horizontally oriented injection units injecting into different parting lines of a mold.

When moving mold clamping unit 3 from the horizontal position shown in FIGURES 1 to 3, into a vertical position illustrated in FIGURES 4 and 5, the center of gravity of mold clamping unit 3 in the figures moves from the left of the axis of rotational travel toward the right and arrives on the right side of the axis of rotation before the mold clamping unit has reached its vertical position. When this vertical position has been reached, parts 13' of stationary mold-clamping plate 13 will come to rest against machine frame 1, thus limiting the pivoting movement. In the position shown in FIGURES 4 and 5, the mold clamping unit 3 has a tilting moment which can not take effect since it has reached a stable position of equilibrium.

Injection units I and III which inject into the parting lines of the mold have pairs of supporting rods 23 and 24 respectively which are received by sockets 11. Sockets 11 have a two-part or bipartite sleeve-like head 11', as shown in the detail views of FIGURES 7 and 8, which encloses a supporting rod of pair of rods 2 or 4 respectively with a joint or seam 38 in socket head 11' extending parallel to the rod. The socket axis $b$—$b$ extends at a right angle to the central axis $c$—$c$ of sleeve-like head 11' for mounting of the respective injection unit at right angles to the center line $a$—$a$ of mold clamping unit 3. Sockets 11 may each be clamped to a rod 2 or 4 with the aid of clamping bolts disposed in lateral threaded projections 39 within the socket head 11' on both sides of seam 38. By loosening the clamping connection of sockets 11, they may be displaced relative to rod 2 or 4 carrying them thus enabling the simple displacement of injection units II and III for the purpose of adapting them to the parting lines or planes of separation of molds having varying dimensions or for adapting them to molds having parting lines in different planes. In FIGURE 5 the injection units II and III being axially parallel to each other are adjusted to parting lines (mold not shown) which are positioned at different heights. However, the mold is freely accessible on at least two sides thereof facing each other while the central planes of the pairs of rods 2, 4 of mold clamping unit 3 are positioned at a relatively large distance from the center line $a$—$a$ of mold clamping unit 3.

Injection unit I as seen in FIGURES 1 and 3 is mounted with its center line coaxial with center line $a$—$a$ of mold clamping unit 3 so as to inject transversely to the parting line of mold clamping unit 3. Connection of the units is made by insertion of the ends of supporting rods 21 and 22 of injection unit I into sockets 33 and 32 respectively, which sockets are formed as part of a reducing member 25. As illustrated in FIGURE 9 the reducing member 25 is inserted into corresponding cylindrically formed portions of mold-clamping plate 13 by way of cylindrical connecting bolts 25' and secured in place there by means of holding screws or clamping bolts 27. The reducing member 25 makes it possible to connect independent injection units of smaller injection molding machines having a smaller distance between carrier rods, to mold-clamping plate 13. The ends of support rods 21 and 22 are securely held in sockets 33 and 32 respectively by means of holding screws 26.

Figure 6:
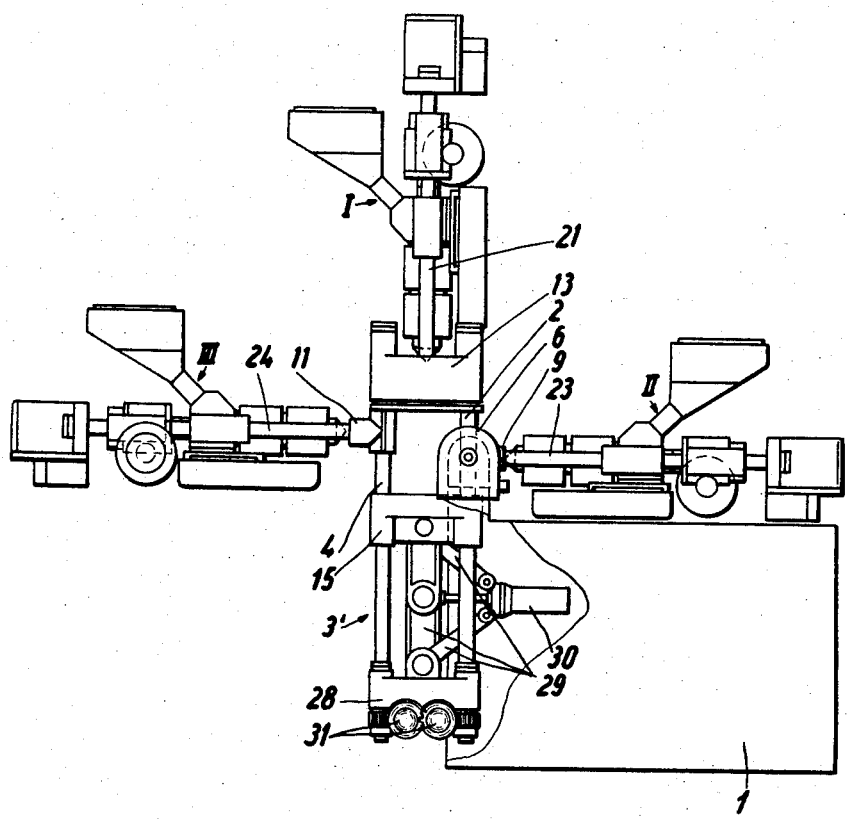
FIGURE 6 is another embodiment of an injection molding machine having a modified construction with a vertical mold clamping unit and three simultaneously operating injection units attached thereto.

Although FIGURES 7 to 9 have been used to illustrate details of the embodiment of the invention as shown in FIGURES 1 to 5, they are actually enlarged views of the embodiment illustrated in FIGURE 6 with similar parts in both embodiments having the same numerical designations.

FIGURE 6 illustrates an embodiment of the present invention with the mold clamping unit 3' so positioned in relation to machine frame 1 so as to allow the attachment of three injection units I, II, III to simultaneously inject into the mold. Mold clamping unit 3' is of similar construction, except for details now discussed, to the construction mold clamping unit 3 in FIGURES 1 to 5. It is mounted in a vertical position with horizontally oriented injection unit III attached by supporting rods 24 and sockets 11 to supporting rods 4 and vertically oriented injection unit I attached by supporting rods 21 and 22 in sockets 33 and 32 respectively to reducing member 25 and mold-clamping plate 13 as previously described.

Injection unit II which is in a horizontal position in this embodiment is attached by its supporting rods 23 in sockets 9 and 10. Sockets 9 and 10 in turn are mounted on pair of supporting rods 2 and enclose with their socket head screw bolts 7, 8 as well as rods 2 (see FIGURES 8 and 9). Rods 2 extend through transverse bores in bolts 7, 8. The bolts are rotatably positioned in machine frame 1 by means of worm gears 6, 6'. In the transverse bores, the rods 2 may be axially displaced and secured in position by clamping together with bolts 7, 8. The clamping takes place through the use of screw bolts 17 and 18, each of which is adapted to be threaded coaxially into a corresponding bolt with its head indirectly supported against the machine frame 1 by means of a cap-like supporting bridge 16. When screw bolts 17, 18 are threaded into corresponding bolts 7, 8 they exert an increasing axial traction. The entire pivotable combination which consists of mold clamping unit and injection units is thus displaceably positioned in bolts 7, 8 in the direction in which the mold clamping unit opens, and therewith relative to machine frame 1.

All of the injection units I, II and III are identical with respect to each other and thus interchangeable and are each adjustably positionable on a single pair of support rods in the direction of the injection axis.

In summary, the features of the present invention include a mold clamping unit which is adapted to be secured to a machine frame in either a horizontal or vertical position with injection units adapted to be connected either at right angles or coaxially thereto. The freely supported units which inject into the parting line are adapted to be connected to pairs of support rods of the mold clamping unit by the ends of their support rods and by means of axially displaceable plug connections whose central planes are positioned outside of center line $a$—$a$ of the mold clamping unit.

It will be understood that the above description of the present invention is susceptible to various modifications, changes, and adaptations, and the same are intended to be comprehended within the meaning and range of equivalents of the appended claims.

What is claimed is:
1. An injection molding machine, comprising in combination:
 (a) a machine frame;
 (b) a mold clamping unit mounted on supporting rods and movably connected to said frame allowing said mold clamping unit to be secured to said machine frame in both a horizontal and a vertical position, said supporting rods of said mold clamping unit having central planes through their axes spaced from the center line of said mold clamping unit;
 (c) coupling members connected to said supporting rods and displaceable independently of each other in the axial direction of said supporting rods; and
 (d) at least one injection unit having support rods attached thereto;
 (e) said coupling members having plug connection means for receiving and holding the ends of said support rods attached to said at least one injection unit.

2. An injection molding machine as defined in claim 1, wherein said mold clamping unit includes a mold clamping plate; and an injection mold having support rods with their ends connected to said mold clamping plate.

3. An injection molding machine according to claim 1, wherein each of said coupling members is a socket having a two-part sleeve-like head clamped on one of said supporting rods.

4. An injection molding machine according to claim 2, wherein said support rods positioning each said injection unit comprises a pair of rods having their central plane extending through the injection axis of said injection unit being positioned thereby.

5. An injection molding machine according to claim 1, wherein said mold clamping unit is pivotally connected to said machine frame about an axis extending at a right angle to the direction of opening and closing of said mold clamping unit and extending in a central plane of a pair of said supporting rods of said mold clamping unit.

6. An injection molding machine according to claim 5, wherein said mold clamping unit includes a mold clamping plate, blocks mounted on said machine frame, and projections extending from said mold clamping plate rotatably positioned in said blocks.

7. An injection molding machine according to claim 5, further comprising bolt means connected to a pair of said supporting rods of said mold clamping unit in a form locking manner and rotatably connected in said machine frame.

8. An injection molding machine according to claim 7, wherein said bolt means have transverse bores therein, said pair of said supporting rods being axially displaceable and clamped in said transverse bores.

9. An injection molding machine according to claim 8, further comprising socket means attached to said pair of said supporting rods and each having a socket head enclosing both one of said bolt means and one of said supporting rods.

10. An injection molding machine according to claim 2, wherein said injection units are supported in their connection to said mold clamping unit exclusively at the ends of their said support rods.

References Cited
UNITED STATES PATENTS

| | | |
|---|---|---|
| 2,438,856 | 3/1948 | Knowles _____ 18—30 |
| 3,014,243 | 12/1961 | Hehl _____ 18—30 |
| 3,034,175 | 5/1962 | Hehl _____ 18—30 |
| 3,173,176 | 3/1965 | Kobayashi _____ 18—30 |
| 3,224,043 | 12/1965 | Lameris et al. _____ 18—30 |

WILBUR L. McBAY, *Primary Examiner.*